United States Patent
Tamura (10) Patent No.: US 10,728,463 B2
(45) Date of Patent: Jul. 28, 2020

(54) IMAGING APPARATUS, CONTROL METHOD AND PROGRAM THEREFOR, AND STORAGE MEDIUM

(71) Applicant: CANON KABUSHIKI KAISHA, Tokyo (JP)

(72) Inventor: Yusuke Tamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/844,373

(22) Filed: Dec. 15, 2017

(65) Prior Publication Data

US 2018/0183987 A1 Jun. 28, 2018

(30) Foreign Application Priority Data

Dec. 27, 2016 (JP) .................................. 2016-254219

(51) Int. Cl.
*H04N 5/235* (2006.01)
*H04N 5/262* (2006.01)
*H04N 5/232* (2006.01)

(52) U.S. Cl.
CPC ......... *H04N 5/2353* (2013.01); *H04N 5/2351* (2013.01); *H04N 5/23245* (2013.01); *H04N 5/2625* (2013.01)

(58) Field of Classification Search
None
See application file for complete search history.

(56) References Cited

U.S. PATENT DOCUMENTS

| 2014/0036233 | A1* | 2/2014 | Posehn | G03B 15/00 352/44 |
| 2014/0347519 | A1* | 11/2014 | Yamamoto | H04N 5/235 348/231.99 |
| 2015/0042849 | A1* | 2/2015 | Negishi | H04N 5/2356 348/251 |
| 2016/0153062 | A1* | 6/2016 | Yamahira | C21B 7/163 266/47 |

FOREIGN PATENT DOCUMENTS

JP 2014-235183 A 12/2014

* cited by examiner

*Primary Examiner* — Mark T Monk
(74) *Attorney, Agent, or Firm* — Canon U.S.A., Inc. IP Division (57) ABSTRACT

An imaging apparatus includes an imaging unit which images a subject, a detection unit which detects a state of the subject, and a control unit which, in a predetermined mode for acquiring an image by intermittently imaging a subject using the imaging unit, controls the intermittent imaging operation of the imaging unit for acquiring the image based on a detection result of the detection unit, in which the control unit determines whether a rate of a region in a frame related to the imaging unit is less than or equal to a predetermined rate, the region having a difference between a plurality of successive detection results obtained by the detection unit being larger than a predetermined value, and controls the intermittent imaging operation of the imaging unit in the predetermined mode according to a result of the determination.

5 Claims, 6 Drawing Sheets

FIG. 7

IMAGING APPARATUS, CONTROL METHOD AND PROGRAM THEREFOR, AND STORAGE MEDIUM

BACKGROUND

Field of the Disclosure

The present disclosure generally relates to imaging and, more particularly, to an imaging apparatus which executes intermittent imaging, a control method and a program therefor, and a storage medium.

Description of the Related Art

As a conventional technique for executing intermittent imaging at predetermined time intervals, so-called interval photographing is known. Also known is a technique for acquiring moving images (time-lapse movie) expressing a subject with a temporal change compressed by stitching images in an order of acquisition, the images being acquired by executing intermittent imaging. In time-lapse movie, with respect to a period from start of first imaging for the time-lapse movie until end of last imaging, a reproduction time of acquired moving images becomes shorter.

Japanese Patent Laid-Open No. 2014-235183 poses a problem that when automatic exposure control is executed for each imaging in interval photographing, large variation in brightness between frames in imaging causes (a user's) uncomfortable feeling when successively viewing the respective frames. To this problem, Japanese Patent Laid-Open No. 2014-235183 proposes a technique of smoothing a current appropriate exposure value, in automatic exposure control processing at the time of interval photographing, on the basis of a history of an appropriate exposure value obtained in automatic exposure control processing at the time of past imaging.

SUMMARY

According to one or more aspects of the present disclosure, an imaging apparatus includes an imaging unit which images a subject; and one or more processors connected to one or more memories to operate as the following units: a detection unit which detects a state of the subject, and a control unit which, in a predetermined mode for acquiring an image by intermittently imaging a subject using the imaging unit, controls the intermittent imaging operation of the imaging unit for acquiring the image based on a detection result of the detection unit, in which the control unit makes a determination whether a rate of a region in a frame related to the imaging unit is less than or equal to a predetermined rate, the region having a difference between a plurality of successive detection results obtained by the detection unit being larger than a predetermined value, and controls the intermittent imaging operation of the imaging unit in the predetermined mode according to a result of the determination.

Further features of the present disclosure will become apparent from the following description of exemplary embodiments (with reference to the attached drawings).

DESCRIPTION OF THE EMBODIMENTS

One or more aspects of the present disclosure will be described below with reference to the accompanying drawings.

(Basic Configuration of Digital Camera 100)

Figure 1:
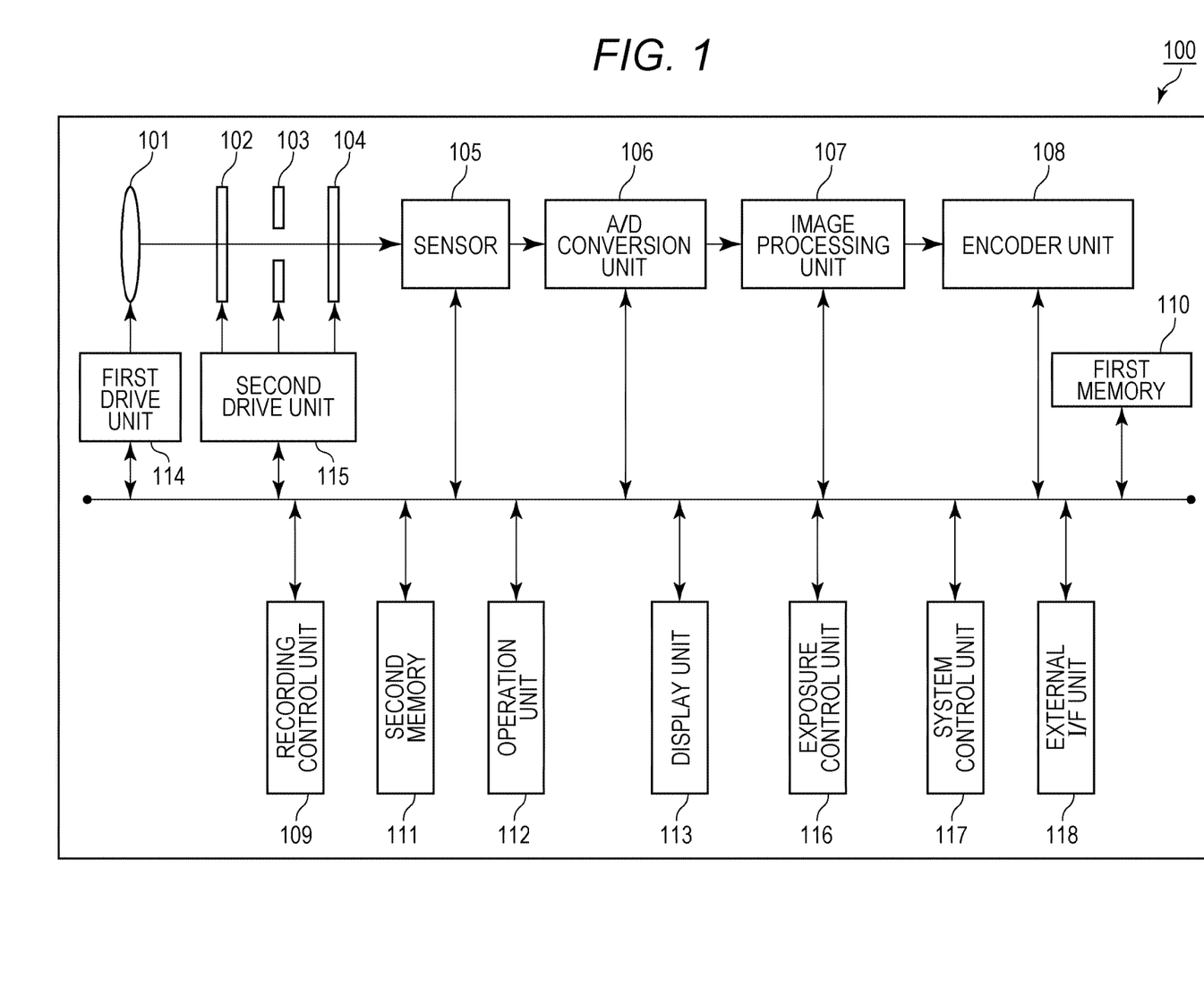
FIG. 1 is a block diagram showing a configuration example of a digital camera 100 which is an embodiment of an imaging apparatus which may implement one or more aspects of the present disclosure.
Figure 2:
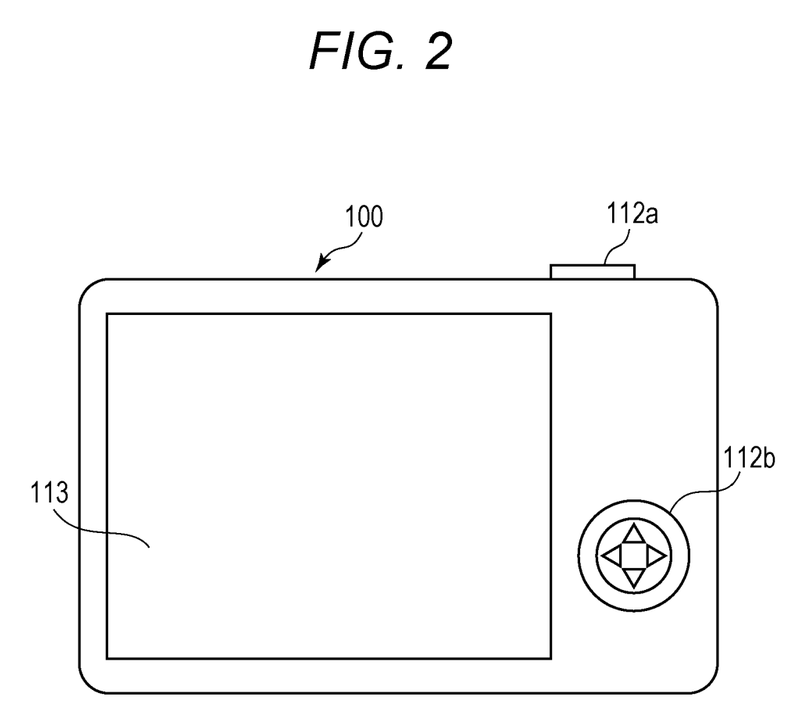
FIG. 2 is a rear view of the digital camera 100 according to one or more aspects of the present disclosure.

FIG. 1 is a block diagram showing a configuration example of a digital camera (hereinafter referred to simply as a camera) 100 which is an embodiment of an imaging apparatus which may implement one or more aspects of the present disclosure. FIG. 2 is a rear view of the camera 100 according to one or more aspects of the present disclosure. At least one functional block shown in FIG. 1 may be realized by hardware such as Application Specific Integrated Circuit (ASIC), Programmable Logic Array (PLA) or the like, or by execution of software by a programmable processor such as a central processing unit (CPU), a micro processing unit (MPU) or the like. Additionally, such functional block may be realized by a combination of software and hardware. Accordingly, in the description below, even a different functional block is recited as an operation entity, the same hardware can be realized as an entity.

As illustrated in FIG. 1, an imaging lens 101 is an imaging lens group including a lens group of a focusing lens, a zoom lens, a shift lens and the like, and is an optical member which guides a luminous flux corresponding to an optical image of a subject to an inside of the camera 100. A neutral density (ND) filter 102 is a light reduction unit which reduces light of a luminous flux incident via the imaging lens 101. A diaphragm 103 is a light amount adjustment member which adjusts an amount of light corresponding to a luminous flux incident via the imaging lens 101. A shutter 104 is a shielding member capable of shielding a luminous flux incident to a sensor 105 to be described later and is capable of changing between a retracting state of guiding an incident luminous flux to the sensor 105 without shielding and a shielding state of shielding an incident light.

The sensor 105 is an imaging unit having structure adopting a charge accumulation type solid-state image pickup element such as a Charge Coupled Device (CCD), a Complementary Metal Oxide Semiconductor (CMOS), or the like. The sensor 105 photoelectric-converts a luminous flux which forms an image on an imaging surface of the sensor 105 to output analog image data (an analog image signal). An analog to digital (A/D) conversion unit 106 is an A/D conversion unit which conducts sampling, gain adjustment, A/D conversion, and the like with respect to analog image data output from the sensor 105 to output digital image data. The A/D conversion unit 106 includes a correlated double sampling circuit which removes noise from a signal received from the sensor 105 and a non-linear amplification circuit for non-linear-amplifying a received signal before conversion to digital image data.

An image processing unit 107 is an image processing unit which subjects digital image data output from the A/D conversion unit 106 to various processing such as white balance adjustment processing, gradation processing or the like to output digital image data subjected to processing. The image processing unit 107 converts the digital image data received from the A/D conversion unit 106 to a luminance-bandwidth-chrominance (YUV) image signal represented with a brightness value and a color difference and outputs the obtained signal.

An encoder unit 108 is a format conversion unit which converts a format of image data. The encoder unit 108 converts, for example, image data input from the image processing unit 107 to have a format for recording. A recording control unit 109 is a control unit which controls recording of image data, which unit controls format conversion of image data on the basis of a recording format set in advance by controlling the encoder unit 108.

A first memory 110 is a first storage unit such as an EEPROM typical of which is a flash memory or the like. In the first memory 110, there are stored in advance, for example, various data such as an arithmetic expression or an operation constant related to operation of the camera 100 of the present embodiment, a computer-controlled program(s), instruction(s), code(s), or the like, for controlling a system control unit 117 to be described later, or the like. A second memory 111 is a second storage unit capable of electrical erasing or storage and includes a Random Access Memory (RAM) region. The second memory 111 functions, for example, as an image memory at the time of imaging a subject.

An operation unit 112 is an operation member manually operable by a user, which is an operation unit enabling input of operation related to each operation of the camera 100. The operation unit 112 is configured with, for example, switches or buttons operable by a user. As illustrated in FIG. 2, the operation unit 112 may include a release switch 112a and an operation dial 112b. The configuration may include, as one of members configuring the operation unit 112, a so-called touch panel which is a display device enabling input of operation corresponding to user's touch operation by sensing electrostatic capacity or pressure. In this case, a display unit 113 to be described later may be a touch panel and the display unit 113 may serve also as the operation unit 112.

The display unit 113 may be a display unit configured with a TFT type thin film transistor drive type liquid crystal display (LCD) capable of displaying image data. The display unit 113 may be capable of displaying analog image data for displaying which data is converted from digital image data by a digital to analog (D/A) conversion unit (not illustrated), and an index, a mark or the like for use in photographing support and operation support of a focus detection region, or the like.

A first drive unit 114 may be a drive unit for a lens which unit causes the imaging lens 101 to be operated according to an instruction of the system control unit 117 to be described later, and may include a motor (not illustrated) for driving the imaging lens 101. A second drive unit 115 may include drive units which cause the ND filter 102, the diaphragm 103, and the shutter 104 to operate according to instructions of an exposure control unit 116 to be described later and the system control unit 117, each of which units may include a motor (not illustrated) for operating each unit. The drive units which cause the ND filter 102, the diaphragm 103, and the shutter 104 to operate will be collectively referred to herein as the second drive unit.

The exposure control unit 116 as an imaging control unit may be an exposure control unit which controls exposure at the time of imaging a subject by using the sensor 105 to obtain image data. The exposure control unit 116 may be capable of controlling exposure parameters such as a density of the ND filter 102 (an amount of light reduction), a diaphragm value related to an opening diameter of the diaphragm 103, a shutter speed related to a charge storage time of the sensor 105, photographing sensitivities including analog and digital gain amounts, and the like. The exposure control unit 116 may execute exposure control so as to have exposure (appropriate exposure) appropriate for brightness of the subject by totally adjusting the above-described respective parameters on the basis of a photometric result (brightness value) obtained by photometry of the subject. Data related to appropriate exposure may be stored in the first memory 110 in advance.

While in the above description, an example has been referred to in which for measuring a state of a subject, photometry of the subject is conducted to calculate a brightness value (brightness information), a configuration of the camera 100 of the present embodiment is not limited thereto. It may be configured, for example, to measure color information of a subject and control color balance in an imaging signal (image signal), or the like on the basis of the measured color information.

The present embodiment may be configured to conduct photometry of a subject on the basis of image data output from the sensor 105. A specific configuration will be described later in a description of imaging operation. By contrast, other sensor for photometry than the sensor 105 may be provided to conduct photometry of a subject on the basis of output of the sensor. For measuring color information of a subject, other sensor(s) for measuring color may be provided to adjust color balance of an imaging signal on the basis of an output of the sensor.

The system control unit 117, which may include one or more processors, one or more memories, circuitry, firmware, hardware, other component, or the like, may be a control unit which may centralizedly control operation of the camera 100 and may internally include a camera CPU as a microprocessor (computer) for control. For example, the system control unit 117 or other circuitry may read one or more programs, instructions, codes, or the like, stored in one or more memories, and then execute the programs, instructions, codes, or the like, to implement operations of one or more aspects of the present disclosure. Additionally, the system control unit 117 may execute various controls and processing to be described later on the basis of a computer-controlled program stored in the first memory 110.

An external interface (I/F) unit 118 may be a connection control unit which may control connection of an external apparatus (not illustrated) or an external memory (not illustrated) provided outside the camera 100 with the camera 100. Fr example, the camera 100 may be capable of recording, in the external memory, acquired image data and the like via the external I/F unit 118, or reading image data and the like recorded in the external memory. The foregoing is a basic configuration of the camera 100 of the present embodiment.

The units described throughout the present disclosure are exemplary and/or preferable modules for implementing processes described in the present disclosure. The modules can be hardware units (such as circuitry, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

(Imaging Operation)

In the following, description will be made of subject imaging operation (hereinafter, referred to as still image imaging operation) for acquiring a still image using the camera 100. First, the system control unit 117 senses the release switch 112a being operated in a state where each unit of the camera 100 is being supplied with electric power, and starts the subject imaging operation. In the imaging operation, first, the shutter 104 provided on a front face of the sensor 105 is retracted from a light path and a luminous flux incident via the imaging lens 101 forms an image on the sensor 105. Next, in response to an instruction from the system control unit 117, the exposure control unit 116 executes exposure operation by causing each unit such as the first drive unit 114 or the second drive unit 115 of the camera 100 to operate on the basis of information related to predetermined exposure for brightness value calculation recorded in advance in the first memory 110.

Next, the system control unit 117 executes imaging and reads charges stored in the sensor 105 to output analog image data. The analog image data is converted to a YUV image signal via the A/D conversion unit 106 and the image processing unit 107, so that the system control unit 117 calculates a brightness value of a subject or the like. In the following description, a brightness value will be represented by a By value using an Additive System of Photographic Exposure (APEX), with 1 By assumed to correspond to brightness of one step of exposure (Ev value).

Here, a brightness value calculation method will be described. The exposure control unit 116 divides the acquired one frame of image data into a plurality of blocks each having a predetermined number of horizontal and vertical pixels to calculate an actually measured brightness value (a first brightness value) as a mean value of each block (hereinafter, referred to simply as BvBlock). Then, the system control unit (the brightness obtaining unit) 117 obtains a representative brightness value (a second brightness value) by integrating a BvBlock of each block. In the present embodiment, the representative brightness value is a brightness value corresponding to an entire subject (an entire frame) and is synonymous with a photometric result of a subject. Here, the above-described frame is an entire frame corresponding to an image to be acquired using the sensor 105 and is assumed to be synonymous with an angle of view at the time of imaging a subject.

The representative brightness value calculating method is not limited thereto, and for example, a BvBlock of each block may be weight-averaged. Additionally, a predetermined weight may be applied to a BvBlock of each block to be weight-averaged. As a representative brightness value, any value can be adopted that takes at least brightness of the entire image (angle of view) into consideration.

Next, the exposure control unit 116 executes exposure control on the basis of the obtained brightness value. To be specific, the exposure control unit 116 changes exposure by a brightness difference of ΔBv between the obtained brightness value and a target brightness value corresponding to appropriate exposure which is recorded in advance in the first memory 110. As a target brightness value, not only one brightness value but also all brightness values may be adopted which are included in a predetermined range with a predetermined brightness value as a criterion. In this case, even when a brightness value changes with a change of brightness of a subject, exposure control according to the brightness change is not executed until a brightness change exceeding the predetermined range (hysteresis) is caused.

Additionally, the system control unit 117 may execute control, such as automatic focus (AF) control, or the like, of calculating distance information (referred to as a subject distance) from the camera 100 to a subject and shifting a lens position of the focusing lens of the imaging lens 101 to a focusing position on the basis of a subject distance. In the present embodiment, although the AF control is executed on the basis of contrast information of image data obtained while displacing the position of the focusing lens of the imaging lens 101, the control is not limited thereto. The AF control can be executed, for example, by a so-called phase difference detection system of calculating a subject distance in which system, pixels for phase difference detection are provided in a plurality of pixels configuring a sensor for the AF control or the sensor 105. The foregoing is imaging preparation operation of the camera 100.

When the imaging preparation operation of the camera 100 is completed, the system control unit 117, in the above-described state of having exposure controlled, again executes photoelectric-conversion of charges by the sensor 105 to obtain analog image data. The obtained analog image data is converted to digital image data after sampling and gain adjustment by the A/D conversion unit 106. In the present embodiment, while steps before output of analog image data by the sensor 105 will be referred to as a subject imaging step, steps before output of digital image data may be assumed to be the subject imaging step.

Thereafter, the digital image data subjected to the above-described various processing by the image processing unit 107 is converted into a format for recording by the recording control unit 109 via the encoder unit 108 and recorded in the second memory 111 and an external recording medium. The above various processing includes gain adjustment as exposure control. Additionally, the system control unit 117 conducts control to display analog image data for display on the display unit 113, the data which is converted from digital image data by the D/A conversion unit (not illustrated). The foregoing is basic still image imaging operation of the camera 100.

In the above description, although a series of operation is successively conducted from the still image imaging preparation to still image data recording and displaying according to user's operation of the release switch 112a, this is not always the case. For example, according to an SW1 state (e.g. half press) of the release switch 112a, the imaging preparation operation may be executed and according to an SW2 state (e.g. full press) of the release switch 112a, actual imaging operation may be executed.

(Imaging Mode)

In the following, description will be made of an imaging mode which can be set by the camera 100. The camera 100 of the present embodiment is capable of setting, as the imaging mode, a normal still image mode, a normal movie mode, and a time-lapse mode.

The normal still image mode is the imaging mode in which one frame of still image data (still images) is acquired and recorded. The normal movie mode is the imaging mode in which moving image data (moving images) is acquired and recorded based on an image data group of a plurality of frames successively acquired at predetermined time intervals using the sensor 105. In the time-lapse mode, image data of a plurality of frames is acquired, for example, by intermittently executing imaging of a subject at a time interval set by a user. Then, by sequentially coupling the image data of the plurality of frames intermittently imaged, a series of moving image data (time-lapse movie) is generated. Although in the time-lapse mode, as image data for use in producing time-lapse movie, image data is used which is obtained by reading a plurality of pixels while thinning the same similarly to that in the normal movie mode, this is not always the case. For example, image data may be obtained which is for use in producing time-lapse movie by the same pixel reading as that when obtaining still image data in the normal still image mode.

Although the present embodiment is configured such that when the time-lapse mode is set, time-lapse movie is produced (synthesized) in the camera 100, this is not always the case. The time-lapse mode only needs to be, for example, an imaging mode in which at least intermittent imaging is executed for time-lapse movie in the camera 100, and production (synthesis) of time-lapse movie may be executed by an external signal processing device of the camera 100.

In the present embodiment, the normal movie mode and the time-lapse mode have different number of times of charge storage (or the number of times of resetting or the number of reading of stored charges) by the sensor 105 in a predetermined period. In the camera 100 of the present embodiment, the time-lapse mode has a less number of times of charge storage by the sensor 105 in the same period than in the normal movie mode. To be specific, in the normal movie mode, reproduction time of moving images acquired and a total imaging time for acquiring the moving images are generally the same. By contrast, in the time-lapse mode, reproduction time of produced time-lapse movie and a total imaging time from start to end of interval photographing for obtaining still image data for the time-lapse movie are different from each other, and the reproduction time is shorter than the total imaging time. This configuration enables time-lapse movie acquired in the time-lapse mode to have temporal change of a subject compressed.

In the time-lapse mode, as a photographing interval for interval photographing, a user is allowed to set an arbitrary imaging interval from among predetermined imaging intervals (time intervals) such as one second, 30 seconds, one minute, 15 minutes, 30 minutes, one hour, three hours, five hours, 10 hours, and 24 hours set in advance. Additionally, a user may be allowed to freely set an imaging interval. For example, the imaging interval may be allowed to be longer than 24 hours, or the imaging interval may be allowed to be shorter than one second.

Additionally, in the time-lapse mode, a total imaging time (or a total number of times of imaging) from start to end of the entire of a plurality of intermittent imaging operations can be set. The camera 100 is also allowed to execute intermittent imaging without a limit as long as electric power supply continues from a power source (not illustrated) such as a battery or the like provided in the camera 100 irrespective of the total imaging time or the total number of times of imaging. The foregoing described respective imaging modes can be freely set by a user by operating the operation unit 112.

Additionally, the camera 100 of the present embodiment, in the time-lapse mode, drives the sensor 105 in the movie mode to acquire a part of frames of movie acquired from the sensor 105 as intermittent images for interval photographing. On the other hand, by causing the display unit 113 to display the acquired movie in succession, live view (LV) display on the display unit 113 may be executed. In the time-lapse mode of the present embodiment, the camera 100 may be configured to extract a recording image (frame) for interval photographing for use in producing time-lapse movie from among images of each frame for use in the LV display on the basis of an imaging interval set in advance. Then, the camera 100 may be configured such that between intermittent imagings for acquiring recording images in the time-lapse mode, a plurality of photometric results may be obtained by conducting a plurality of times of subject measurement operation of a subject or the like in line with acquisition of images of each frame for use in the LV display.

In a case where an interval where a vertical synchronous signal is transmitted toward the sensor 105 is assumed to be one frame period, the subject measurement operation such as photometry of a subject may not necessarily be conducted for one frame in LV display, and a brightness value may be acquired by photometry of a subject on, for example, a six frame basis. In the camera 100 of the present embodiment, at least between one imaging and subsequent imaging in intermittent imaging in the time-lapse mode, photometry may be conducted a plurality of times to obtain a brightness value of a subject a plurality of times in temporal succession.

(Time-Lapse Mode)

Figure 3:
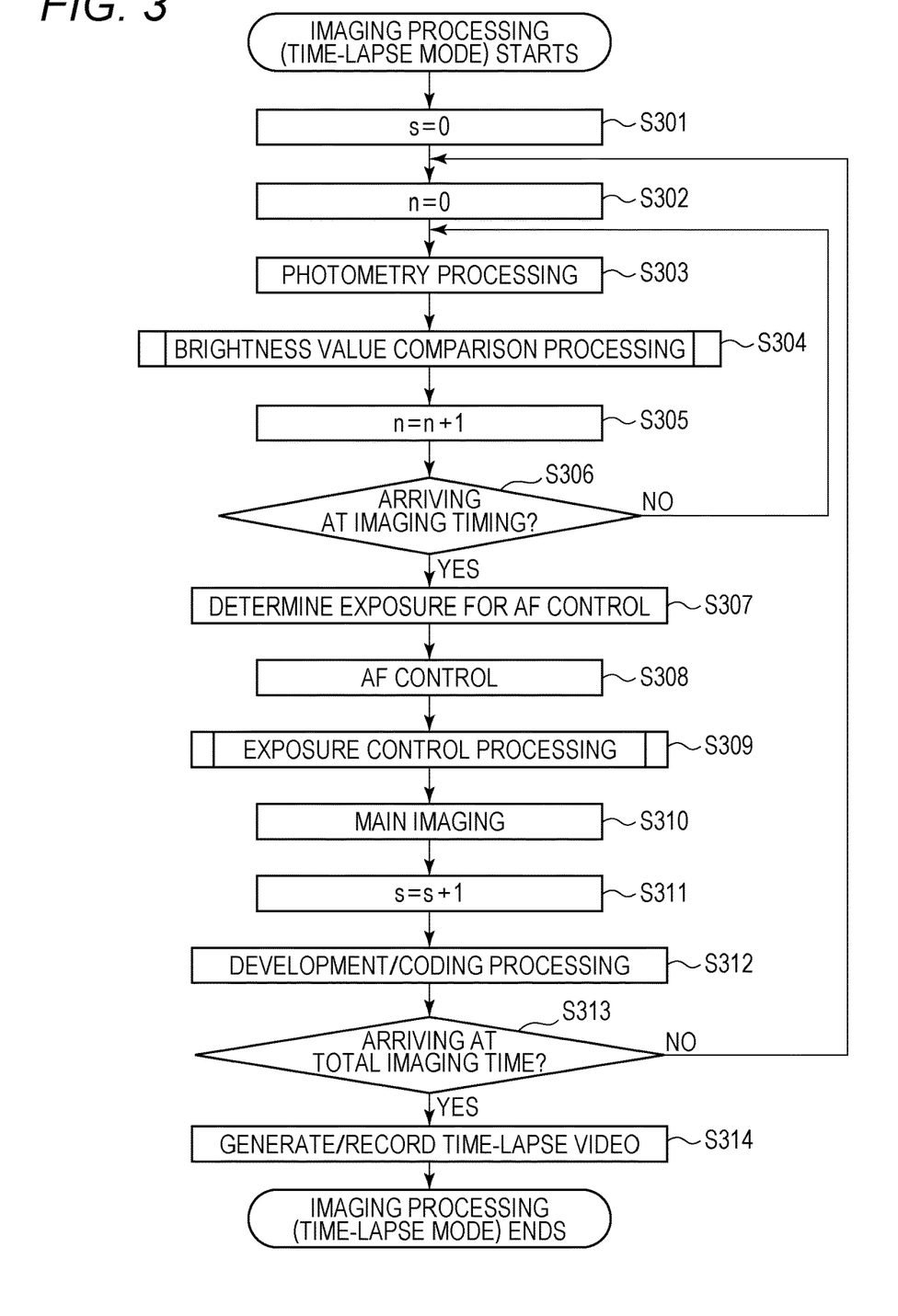
FIG. 3 is a flow chart for explaining imaging processing in a time-lapse mode according to one or more aspects of the present disclosure.

In the following and with reference to FIG. 3, description will be made of the imaging processing of the camera 100 according to the present embodiment in the time-lapse mode. FIG. 3 is a flow chart for explaining the imaging processing in the time-lapse mode according to one or more aspects of the present disclosure. The imaging interval and the total imaging time are assumed to be set by a user in advance.

In the time-lapse mode, when the user gives an instruction to start imaging, as illustrated FIG. 3, the system control unit 117 initializes a variable s to be s=0, the variable indicative of the number of times of imaging in the imaging processing for acquiring one time-lapse movie in Step S301.

Next, in Step S302, the system control unit 117 initializes a variable n to be n=0. Here, the variable n indicates, in the imaging processing for acquiring one time-lapse movie, the number of times of acquisition of subject information related to subject measurement in a period (imaging interval) from end of one main imaging to subsequent main imaging. In the present embodiment, as subject information, the variable n is initialized to be n=0, the variable indicative of the number of executions of brightness value obtaining processing (hereinafter, referred to as photometry processing).

Next, in Step S303, the system control unit 117 obtains an actually measured brightness value BvBlock which is a mean brightness value of each block, and a representative brightness value Bv on the basis of image data (hereinafter, simply referred to as an image) acquired using the sensor 105.

Next, in Step S304, the system control unit 117 compares the BvBlock (n) in n-th photometry processing which has been obtained in Step S303 with BvBlock (n−1) in (n−1)-th photometry processing. In the present embodiment, by setting exposure for imaging (the main imaging) to acquire an image for recording (a recording image) for use in producing time-lapse movie on the basis of the comparison result, unnatural flicker is suppressed from being generated in time-lapse movie. Details of the brightness value comparison processing will be described later.

Next, in Step S305, the system control unit 117 increments the variable n to be n=n+1. Next, in Step S306, the system control unit 117 reads the imaging interval set in advance to determine whether a time lapse from start of the imaging processing or the previous main imaging to the present reaches the imaging interval or not.

When the system control unit 117 determines that the time lapse is yet to reach the imaging interval (NO in Step S306), the processing returns to Step S303. Additionally, when the system control unit 117 determines that the time lapse reaches the imaging interval (YES in Step S306), the processing proceeds to Step S307.

In Step S307, the exposure control unit 116 determines exposure for the AF control on the basis of the representative brightness value By obtained by the n-th photometry processing (Step S303). Then, the system control unit 117 controls each unit of the camera 100 to set the exposure for the AF control. For the exposure for AF, using a program diagram recorded in the first memory 110 in advance, a diaphragm value on a release side is set such that a depth of a subject is small. Then, in Step S308, the system control unit 117 executes the AF control on the basis of an image acquired by the exposure for the AF control.

Next, in Step S309, the exposure control unit 116 sets exposure for the subsequent main imaging in the time-lapse mode on the basis of the comparison result of brightness values obtained in Step S304 and the representative brightness value By obtained by the n-th photometry processing obtained in Step S303. Details of the exposure control processing for main imaging will be described later.

Next, in Step S310, the system control unit 117 executes the main imaging using the sensor 105 to acquire an image for recording (a recording image) for use in production of time-lapse movie. Timing for executing the main imaging is controlled by the system control unit 117 according to an output of a timing generator (not illustrated) based on an imaging interval set in advance. Additionally, in response to completion of the main imaging, the system control unit 117 resets time measurement related to an imaging interval by a timer (not illustrated) provided inside the system control unit 117. The timer is a so-called real time clock and is capable of accurate measurement related to an imaging interval and a total imaging time in the time-lapse mode.

Next, in Step S311, the system control unit 117 increments the variable s to be s=s+1. Next, in Step S312, the system control unit 117 generates image data by applying development processing or coding processing for the acquired recording image via the image processing unit 107 and the encoder unit 108. Thus, still image data of one frame for recording obtained by one main imaging is output to a recording medium not illustrated by the external I/F 118 and is coupled and recorded as time-lapse movie.

Next, in Step S313, the system control unit 117 reads a total imaging time (or a total number of times of imaging) set in advance to determine whether a cumulative total of imaging time up to the present reaches the total imaging time or not. When the system control unit 117 determines that the imaging time up to the present is yet to reach the total imaging time (NO in Step S313), the processing returns to Step S302. Then, the system control unit 117 starts processing corresponding to the subsequent main imaging.

Additionally, when the system control unit 117 determines that the imaging time up to the present reaches the total imaging time (YES in Step S313), the processing proceeds to Step S314. Then, in Step S314, the system control unit 117 generates moving image data by stitching the recording images acquired up to the present in the order of acquisition and records the same in the second memory 111. The moving image data is time-lapse movie. When recording of the time-lapse movie is completed, the series of imaging processing ends. The acquired time-lapse movie can be configured to be recorded in an external device or an external memory by the recording control unit 109 via the external I/F unit 118. The foregoing is the imaging processing related to the camera 100 of the present embodiment in the time-lapse mode.

(Brightness Value Comparison Processing)

Figure 4:
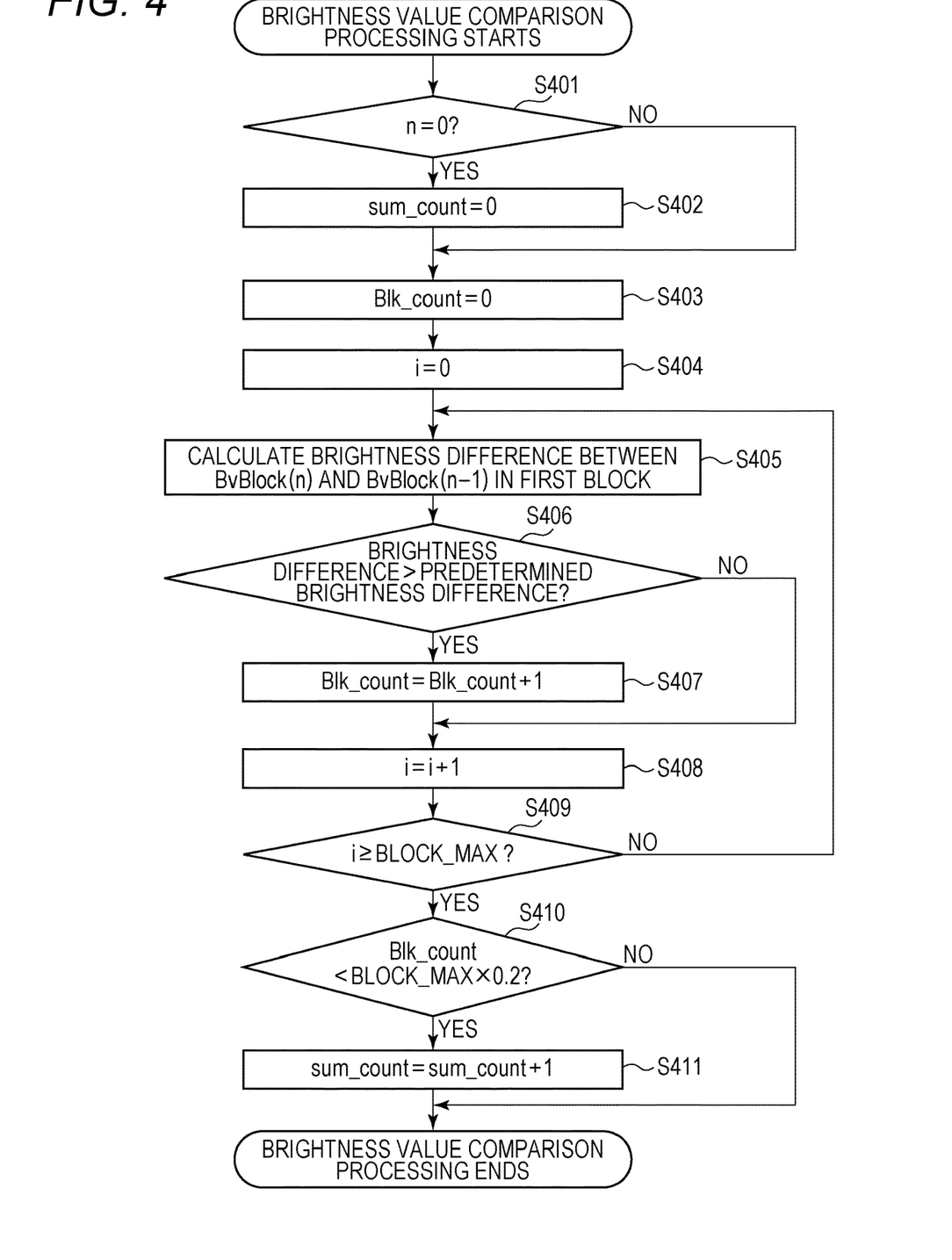
FIG. 4 is a flow chart for explaining brightness value comparison processing according to one or more aspects of the present disclosure.

In the following, description will be made of details of brightness value comparison processing (hereinafter, simply referred to as comparison processing) in the time-lapse mode of the camera 100 according to the present embodiment with reference to FIG. 4. In the present embodiment, a local brightness change is detected within a frame of an image acquired in the time-lapse mode. Therefore, in the present embodiment, processing of comparing brightness values of the respective blocks obtained by successive photometry processing is executed. FIG. 4 is a flow chart for explaining brightness value comparison processing according to one or more aspects of the present disclosure. In the figure, n represents the number of executions of the photometry processing during a period from after execution of one main imaging processing until the subsequent main imaging processing is executed as described above. Accordingly, for example, BvBlock (n) represents a photometric result corresponding to the n-th photometry processing in a period from one main imaging to the subsequent main imaging. Additionally, sum_count and Blk_count in the figure are variables indicative of the number of times when a predetermined condition is satisfied in the brightness value comparison processing to be described later. Details of the variable will be described later. The processing shown in FIG. 4 is executed by the system control unit 117 every time one photometry processing is executed. Additionally, the system control unit 117 holds, in the second memory 111, a brightness value of each block obtained by the n-th photometry processing until the processing of FIG. 4 corresponding to the subsequent, i.e. the (n+1)-th photometry processing is completed.

Figure 5:
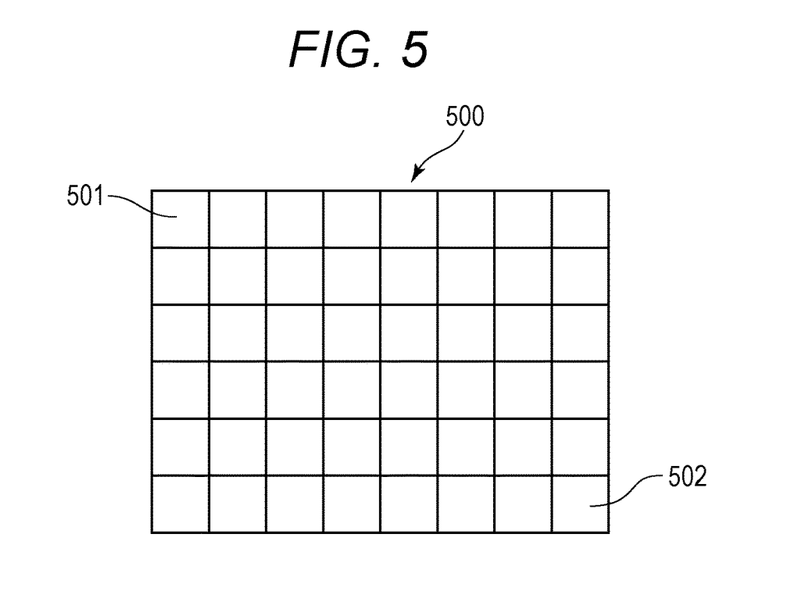
FIG. 5 is a view for illustratively explaining a plurality of blocks from which brightness values are obtained according to one or more aspects of the present disclosure.

Here, details of the actually measured brightness value BvBlock will be described with reference to FIG. 5. FIG. 5 is a view for illustratively explaining a plurality of blocks in one frame of an image output from the sensor 105. As illustrated in FIG. 5, one entire frame is divided into the plurality of blocks in horizontal and vertical directions. In the present embodiment, with respect to each block shown in FIG. 5, a brightness value is acquired. The actually measured brightness value BvBlock may be a mean brightness value in each block. A symbol i in FIG. 4 which is to be described later represents an actually measured brightness value BvBlock corresponding to a position of the block illustrated in FIG. 5. For example, a block 501 in FIG. 5 is a block corresponding to the position of i=0 from which an actually measured brightness value BvBlock is to be obtained.

Additionally, BLOCK_MAX in FIG. 4 is a variable representing a total number of divisional blocks in one frame. For example, in an example shown in FIG. 5, BLOCK_MAX is 48 and a block 502 is a block corresponding to the position of i=BLOCK_MAX from which an actually measured brightness value BvBlock is to be acquired.

As illustrated in FIG. 4, when the comparison processing is started, the system control unit 117 determines whether the comparison processing is based on the photometry processing corresponding to n=0 or not in Step S401. In other words, in Step S401, the system control unit 117 determines whether the present comparison processing is processing corresponding to the first photometry processing after one main imaging processing or not.

When the system control unit 117 determines that the comparison processing is processing corresponding to the photometry processing with n=0 (YES in Step S401), the system control unit 117 initializes the variable sum_count to be 0 in Step S402. The variable sum_count is a variable indicating the number of times of detection of a brightness value change in a local region in a period (interval-imaging interval) from one main imaging to the subsequent main imaging.

Additionally, when the system control unit 117 determines that the comparison processing is not processing corresponding to the photometry processing with n=0 (NO in Step S401), the processing proceeds to Step S403. Then, in Step S403, the system control unit 117 initializes the variable Blk_count so as to have the variable Blk_count=0. The variable Blk_count is a variable indicating the number of blocks determined to have a brightness difference from a previous ((n−1)-th) photometric result (actually measured brightness value) which is larger than a predetermined value in the processing of comparing brightness values of the respective blocks of the same frame.

Next, in Step S404, the system control unit 117 initializes the variable i to be 0. Next, in Step S405, the system control unit 117 calculates a difference of brightness values (brightness difference), between the actually measured brightness value BvBlock (n) corresponding to the n-th photometric processing and the actually measured brightness value BvBlock (n−1) corresponding to the (n−1)-th photometric processing in the same block. The above-described same block represents a block having the same variable i. In other words, the system control unit 117 calculates, between two successive main imagings, a difference of brightness values (brightness difference) between an n-th photometric result and an (n−1)-th photometric result of each block in Step S405.

Next, in Step S406, the system control unit 117 determines whether the brightness difference calculated in Step S405 is larger than a predetermined brightness difference or not. Specifically, in Step S406, the system control unit 117 detects a block having a brightness value change larger than the predetermined value among the respective blocks. In the present embodiment, the predetermined brightness difference is set to be 0.2 step (0.2 Bv).

When the system control unit 117 determines that the brightness difference is larger than the predetermined brightness difference (YES in Step S406), the processing proceeds to Step S407. Then, in Step S407, the system control unit 117 increments the variable Blk_count to set Blk_count=Blk_count+1.

Additionally, when the system control unit 117 determines that the brightness difference is less than or equal to the predetermined brightness step difference (NO in Step S406), the processing proceeds to Step S408. Then, in Step S408, the system control unit 117 increments the variable i to be i=i+1.

Next, in Step S409, the system control unit 117 determines whether the value of the variable i reaches BLOCK_MAX or not (determine that i≥BLOCK_MAX). Specifically, determination is made whether in all the blocks corresponding to the entire frame, comparison between a brightness value obtained by the n-th photometric result and a brightness value obtained by the (n−1)-th photometric result is completed or not.

When the system control unit 117 determines that the variable i reaches BLOCK_MAX (YES in Step S409), the processing proceeds to Step S410. Additionally, when the system control unit 117 determines that the variable i is yet to reach BLOCK_MAX (NO in Step S409), the processing proceeds to Step S405.

Next, in Step S410, the system control unit 117 determines whether a rate of the variable Blk_count for BLOCK_MAX is smaller than a predetermined rate or not on the basis of data stored in the camera 100 up to the present in the comparison processing of brightness values obtained by the n-th photometric result. In other words, in Step S410, the system control unit 117 determines whether the number of the variable Blk_count stored up to the present in the comparison processing of brightness values obtained by the n-th photometric result is smaller than a rate corresponding to the predetermined number for BLOCK_MAX or not. In the present embodiment, for defining a size of a local region in an imaging frame, the above-described predetermined rate is set to be 20% of the entire frame.

When determination is made that the rate of the variable Blk_count is smaller than the predetermined rate (20%) (YES in Step S410), the system control unit 117 increments the variable sum_count by 1 to end the comparison processing in Step S411. Additionally, when determination is made that the rate of the variable Blk_count is not less than the predetermined rate (20% or more) (NO in Step S410), the comparison processing is ended without incrementing the variable sum_count.

As exceptional processing, in intermittent imaging in the time-lapse mode, the system control unit 117 ends the comparison processing without executing the processing from Step S403 on, in the comparison processing corresponding to first photometry processing (n=0) in a period from one main imaging to the subsequent main imaging (interval-imaging interval). The foregoing is the brightness value comparison processing related to the camera 100 of the present embodiment. By thus executing the comparison processing, it is possible to detect a brightness of a subject in locally (by repetition) changing within a frame.

(Exposure Control Processing for Main Imaging)

Figure 6:
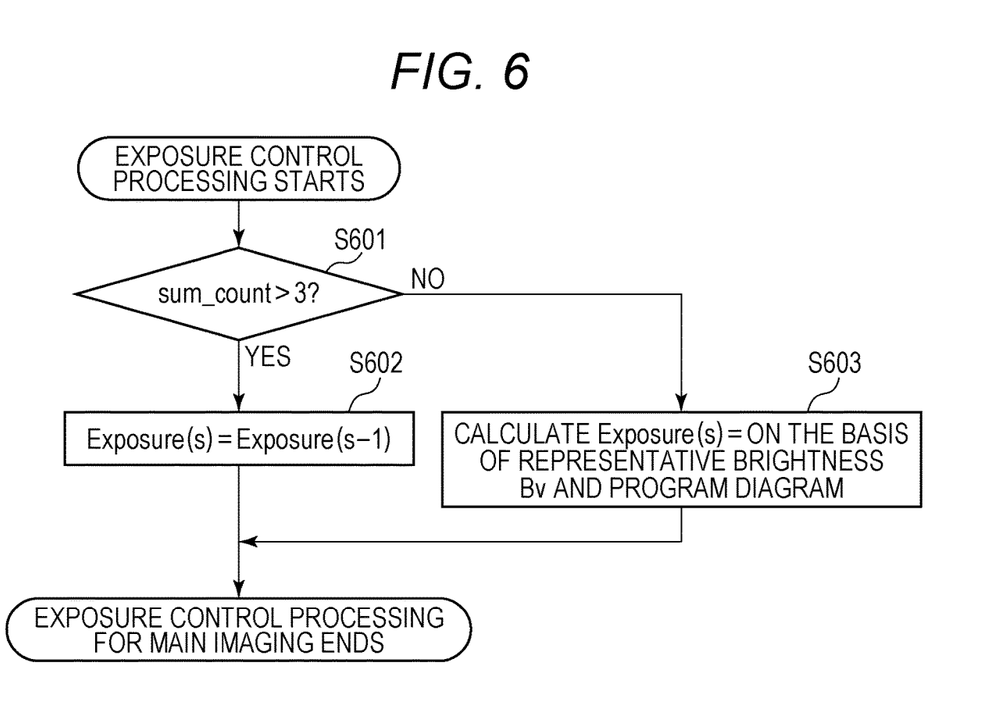
FIG. 6 is a flow chart for explaining exposure control processing in the time-lapse mode according to one or more aspects of the present disclosure.

In the following and with reference to FIG. 6, description will be made of details of exposure control processing for main imaging in the time-lapse mode of the camera 100 according to the present embodiment. FIG. 6 is a flow chart for explaining the exposure control processing in the time-lapse mode according to one or more aspects of the present disclosure. In the figure, the variable s represents the number of times of imaging (the number of times of the main imaging) in the time-lapse mode for acquiring one time-lapse movie as above-described. Additionally, "Exposure" in the figure represents information (data) about exposure for the main imaging. For example, Exposure(s) is information about exposure corresponding to the time of the s-th main imaging in the time-lapse mode for acquiring one time-lapse movie. The processing shown in FIG. 6 is executed at the time of processing of one main imaging.

As illustrated in FIG. 6, when the exposure control processing starts, in Step S601, the system control unit (measurement unit) 117 determines whether a value of the variable sum_count (the number of counts) obtained by the above comparison processing is not less than a predetermined number or not. Specifically, determination is made whether between successive two main imaging processings, more local changes are detected in an image than the predetermined number (larger than the predetermined number of times) or not. In the present embodiment, the predetermined number is set to be 3.

When the system control unit 117 determines that the variable sum_count is larger than 3 (YES in Step S601), the processing proceeds to Step S602. Then, in Step S602, the system control unit 117 sets exposure Exposure(s) corresponding to the time of the s-th main imaging to be the generally same exposure as exposure Exposure(s−1) corresponding to (using for) the time of the previous (the (s−1)-th) main imaging. Here, the generally same exposure in the present embodiment is assumed to be exposure that has an exposure difference within one step as an APEX unit.

Additionally, when the system control unit 117 determines that the variable sum_count is not larger than 3 (NO in Step S601), the processing proceeds to Step S603. Then, in Step S603, the system control unit 117 calculates exposure Exposure(s) corresponding to the s-th main imaging on the basis of an actually measured brightness By obtained by the n-th the photometry processing (Step S303) in an immediately preceding imaging interval (a period from the (s−1)-th main imaging to the s-th main imaging). In Step S603, the calculation is made using a program diagram related to determination of exposure recorded in advance in the first memory 110. The foregoing is the exposure control processing of the present embodiment.

Figure 7:
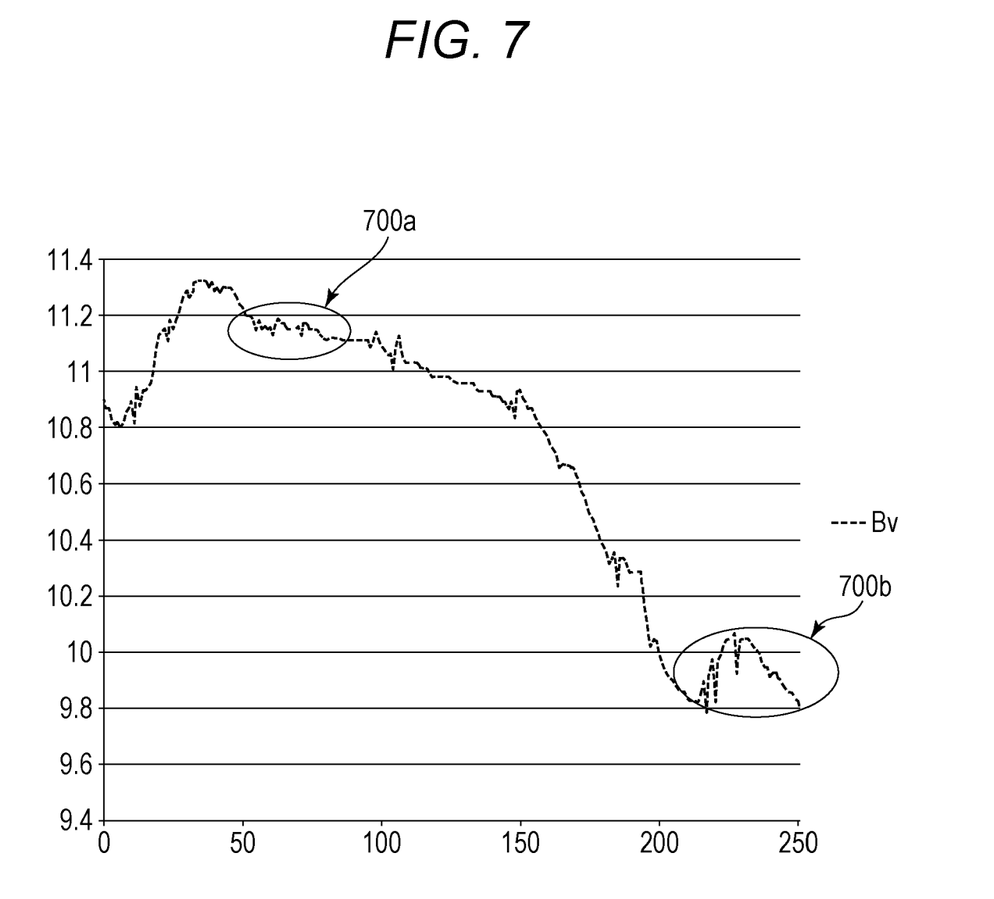
FIG. 7 is a view for illustratively explaining temporal shift of a brightness value when interval photographing is executed at an imaging interval of 60 seconds in a scene where environment light changes with the lapse of time from evening to night.

Here, details of a situation where the processing shown in Step S602 is executed will be described with reference to FIG. 7. FIG. 7 is a view for illustratively explaining temporal shift of a brightness value when the interval photographing (main imaging) is executed at an imaging interval of 60 seconds in a scene where environment light changes with the lapse of time from evening to night. In FIG. 7, the ordinate represents a brightness value By shown in APEX, and the abscissa represents the number of times of imaging in interval photographing. Additionally, similarly to the camera 100 of the present embodiment, the brightness value By is assumed to be a representative brightness value obtained as a result of photometry of the entire subject (entire frame).

As illustrated in FIG. 7, when time elapses from evening to nigh, because environment light gradually darkens as the sun goes down, a brightness value of a subject gradually decreases. Additionally, apart from such a temporal change of the environment light, when brightness of a light source present in a local region within a frame (an angle of view) irregularly changes, for example, as blinking of decorative lights equipped in a Ferris wheel or the like, a brightness value of the entire frame also changes.

A first brightness change region 700a and a second brightness change region 700b in FIG. 7 show, as an example, such an irregular change of a brightness value as described above. In the interval photographing (the time-lapse mode in the present embodiment), when exposure is changed in each intermittent imaging (the main imaging) according to the change of the brightness value, brightness of each subject minutely changes among acquired images. Accordingly, in time-lapse movie obtained by stitching images each having brightness minutely changing, unnatural flicker is caused due to a change of brightness of each subject, resulting in giving uncomfortable feeling to a user who checks the time-lapse movie.

As described in the foregoing, in a case of execution of intermittent imaging, when a brightness value of the entire frame changes due to a change of brightness in a local region, it may be desirable not to change exposure unnecessarily between intermittent imagings.

In order to ameliorate or otherwise overcome or address this, when in the time-lapse mode of the present embodiment, a change in a plurality of photometric results between main imagings obtained in a locally occupied region in the entire screen is large, exposure at the time of the main imaging can be controlled not to be changed from that of the previous main imaging. This configuration enables the camera 100 of the present embodiment to suppress, in the time-lapse mode, variation in brightness between images for recording caused by a change in brightness of a local region of a subject. Accordingly, the camera 100 of the present embodiment is allowed to suppress generation of unnatural flicker in time-lapse movie based on image data obtained by intermittently imaging a subject.

While the present disclosure has been described with respect to one or more aspects of the present disclosure in the foregoing, the present disclosure is not limited thereto and allows for various modifications and changes within a range of the gist of the disclosure. For example, while in the above-described one or more aspects of the present disclosure, the camera 100 may be configured to internally produce time-lapse movie in the time-lapse mode, this is not always the case. Specifically, the camera 100 may be configured to conduct intermittent imaging (interval photographing) for acquiring a recording image for use in production of time-lapse movie and produce time-lapse movie in an external apparatus or on a computer network.

Additionally, although in the above-described one or more aspects of the present disclosure, it may be configured to maintain exposure of the previous main imaging when a change of a brightness value, the change not smaller than a predetermined step in a local region occupying 20% or less of the entire frame, is detected between intermittent imagings more than a total of three times, this is not always the case. For example, a rate of a local region to the entire frame may be set to a value other than 20%, or a value corresponding to a range set by user's operation may be set.

Additionally, as the number of times (the predetermined number) of detection of a brightness change, the number for use in determining whether exposure at the time of the previous main imaging is maintained or not, other value than 3 may be set. In particular, since in the time-lapse mode, a user can arbitrarily set an imaging interval between main imagings, it is desirable to set a second interval to have the less number of times of detection as a threshold value for the determination, the second interval having an imaging interval shorter than a first interval having a longer imaging interval. Since this configuration enables a threshold value to be set according to an imaging interval, unnatural flicker can be suppressed from being generated in time-lapse movie irrespective of an imaging interval.

Additionally, although the above-described embodiments may be configured such that when a brightness value change larger than a predetermined value in a local region is detected, exposure at the time of (the present) main imaging is not changed from exposure at the time of the previous main imaging, the configuration is not limited thereto.

It may be configured to set, for example, between successive main imagings (first imaging and second imaging) in the time-lapse mode, a degree how exposure for use in the second imaging follows exposure for use in the first imaging. To be specific, exposure for use in the second imaging can be set by setting a degree of weighting on a representative brightness value corresponding to the first imaging and a degree of weighting on a representative brightness value corresponding to the second imaging.

It may be configured, for example, to execute exposure control by using, as a photometric result for use in the n-th main imaging, an (n−1)-th photometric result at a rate less than or equal to a predetermined rate relative to an n-th photometric result. When combining this configuration with the above-described embodiment, at determination of YES in Step S601, a degree of weighting on a representative brightness value (or exposure) used in the previous main imaging is set to be 1, and a degree of weighting on a representative brightness value obtained for the present main imaging is set to be 0. Additionally, when the determination in Step S601 is NO, a degree of weighting on a representative brightness value (or exposure) used in the previous main imaging is set to be 0, and a degree of weighting on a representative brightness value obtained for the present main imaging is set to be 1. A degree of weighting can be set to other value than 1 and 0 according to a determination result of a region in a frame having a locally changing brightness.

Further, the above-described configuration may be effective when on the basis of a brightness value (photometric result) used in past main imaging and a brightness value (photometric result) corresponding to present main imaging in the time-lapse mode, exposure for use in the present main imaging is smoothed. In this case, when a brightness change larger than a predetermined value in a local region is detected, a weighting degree for a photometric result (or past exposure) used in the past main imaging is set to be relatively large and a weighting degree for the present photometric result is set to be relatively small. Since this configuration enables exposure for each of a plurality of times of main imaging to be smoothed so as to make a brightness change between recording images be smooth, unnatural flicker can be suppressed from being generated in time-lapse movie.

Additionally, in addition to the processing of Step S601 in the above-described embodiment, such a configuration may be adopted to determine whether a representative brightness value By (n) corresponding to the present main imaging falls within a predetermined range relative to a representative brightness value By (n−1) corresponding to the previous main imaging or not. Then, when the representative brightness value By (n) falls within the predetermined range relative to the representative brightness value By (n−1), exposure used in the previous main imaging is set to be exposure for use in the present main imaging.

While in the above-described embodiments, the description has been made of an example where a brightness value is measured as a subject measurement value (measurement result) in the subject measurement operation to change an exposure control state (imaging control condition) on the basis of the brightness value, color information can be measured in place of a brightness value to execute the same processing. In such a case, an imaging control condition is changed by subjecting image data (imaging signal) to such processing as adjustment of color balance. Additionally, in such imaging control condition as described above includes such color balance correction processing or brightness gain adjustment as described above with respect to an imaging signal.

Additionally, while in the above-described embodiment, the description has been made of a configuration in which a plurality of times of subject measurement (e.g. photometry) is conducted between intermittent imagings in the interval photographing to compare the obtained plurality of brightness values according to a time series, this is not always the case. The above-described configuration is applicable also when, for example, subject measurement (photometry etc.) is executed only once to suit main imaging in the interval photographing. In other words, the above-described configuration is applicable to a case where at least one subject measurement is executed between intermittent imagings. To be specific, it may be configured such that when only one photometry is conducted to suit main imaging for acquiring a recording image, an (n−1)-th brightness value and an n-th brightness value are compared. In particular, by applying the present configuration when an imaging interval is short, interval photographing with a suppressed effect of a local brightness change in a frame is enabled by detecting the local brightness change while reducing disability related to photometry.

When the configuration is adopted, a photometric result is used as it is for exposure control in first imaging. Additionally, when the configuration is adopted, a count in the above-described Step S601 may be made over imagings in intermittent imaging or a threshold value may be set to 1.

Additionally, although the above-described embodiments may be configured to control operation of the camera 100 by operation of the recording control unit 109, the first memory 110, the second memory 111, the exposure control unit 116, and the system control unit 117 in association with each other, this is not always the case. For example, with a computer program according to the flow charts illustrated in the above-described FIGS. 3, 4, and 6 being stored in the first memory 110 in advance, operation of the camera 100 may be controlled by execution of the computer program by the system control unit 117 or the like.

Additionally, any form of a program is applicable that has a function of a program, such as a program to be executed by an object code or an interpreter, script data to be supplied to an OS, and the like. Additionally, a recording medium for supplying a program can be, for example, a magnetic recording medium such as a hard disk, a magnetic tape, or the like, or an optical/magneto-optical recording medium.

Additionally, while the above-described embodiments have been described with respect to a digital camera adopted as one example of an imaging apparatus which may implement the present disclosure, this is not always the case. For example, such a configuration is applicable as adopts a transportable device such as a digital video camera or a smartphone, or an imaging apparatus other than a digital camera such as a security camera.

Other Embodiments

With a system or a device being supplied with a program which realizes the functions of the above-described embodiments via a network or a storage medium, the present disclosure can be also realized by processing of reading and executing the program by one or more processors and one or more memories in a computer in the system or the device. The present disclosure can be also realized by circuitry, firmware, hardware, other component, or the like (e.g. ASIC or the like), which may realize at least one function.

Other Embodiments

Embodiment(s) or one or more aspects of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more aspects of the present disclosure, and by a method performed by the computer of the system or apparatus by, for example, reading out and executing the computer executable instructions from the storage medium to perform the functions of one or more of the above-described embodiment(s) and/or controlling the one or more circuits to perform the functions of one or more aspects of the present disclosure. The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2016-254219, filed Dec. 27, 2016, which is hereby incorporated by reference herein in its entirety.

What is claimed is:

1. An imaging apparatus comprising:
   an imaging unit; and
   one or more processors connected to one or more memories to operate as the following units:
   a control unit which performs comparison processing to determine whether brightness locally changes in a predetermined region of a frame between successive images output from the imaging unit in a predetermined mode for intermittently acquiring a plurality of images of a subject using the imaging unit for generating a time-lapse movie, and controls exposure for acquiring the plurality of images based on a predetermined condition of the comparison processing,
   wherein the comparison processing determines that brightness locally changes in the frame when a rate of a region whose brightness changes in the frame between the successive images is less than or equal to a predetermined rate, and
   wherein in a case where the brightness locally changes greater than a predetermined value, the control unit controls exposure of n-th imaging by the imaging unit such that brightness of an image acquired by the n-th imaging in the intermittent imaging by the imaging unit becomes brightness corresponding to brightness of an image acquired by (n−1)-th imaging.

2. The imaging apparatus according to claim 1, wherein in a case where the brightness locally changes less than the predetermined value, the control unit controls exposure of the n-th imaging based on information about a state of a subject obtained in association with the n-th imaging.

3. The imaging apparatus according to claim 1, wherein the control unit control the n-th imaging based on the number of times when the determination is made that brightness locally changes in the frame from the (n−1)-th imaging to the n-th imaging.

4. A method for controlling an imaging apparatus including an imaging unit, the method comprising:
   a controlling step of performing comparison processing to control exposure for acquiring a plurality of images based on a predetermined condition of the comparison processing obtained by determining whether in a predetermined mode for intermittently acquiring the plurality of images of a subject by using the imaging unit for generating a time-lapse movie, brightness locally changes or not in a frame between successive images output from the imaging unit, and
   wherein in the controlling step, it is determined that brightness locally changes in the frame when a rate of a region whose brightness changes in the frame between the successive images is less than or equal to a predetermined rate, and
   wherein in a case where the brightness locally changes greater than a predetermined value, the control unit controls exposure of n-th imaging by the imaging unit such that brightness of an image acquired by the n-th imaging in the intermittent imaging by the imaging unit becomes brightness corresponding to brightness of an image acquired by (n−1)-th imaging.

5. A non-transitory computer-readable storage medium which stores a computer-readable program for causing a computer to execute a method of controlling an imaging apparatus including an imaging unit, the storage medium comprising:
   a controlling step of performing comparison processing to control exposure for acquiring a plurality of images based on a predetermined condition of the comparison processing obtained by determining whether in a predetermined mode for intermittently acquiring the plurality of images of a subject by using the imaging unit for generating a time-lapse movie, brightness locally changes or not in a frame between successive images output from the imaging unit, and
   wherein in the controlling step, it is determined that brightness locally changes in the frame when a rate of a region whose brightness changes in the frame between the successive images is less than or equal to a predetermined rate, and
   wherein in a case where the brightness locally changes greater than a predetermined value, the control unit controls exposure of n-th imaging by the imaging unit such that brightness of an image acquired by the n-th imaging in the intermittent imaging by the imaging unit becomes brightness corresponding to brightness of an image acquired by (n−1)-th imaging.

* * * * *